United States Patent [19]

Tuggler, Jr.

[11] Patent Number: 4,930,815
[45] Date of Patent: Jun. 5, 1990

[54] RING SEAL COLLAR FOR AIR DUCTS

[75] Inventor: William P. Tuggler, Jr., Jacksonville, Fla.

[73] Assignee: Crown Products Company, Inc., Jacksonville, Fla.

[21] Appl. No.: 305,188

[22] Filed: Feb. 2, 1989

[51] Int. Cl.⁵ .............................................. F16L 3/04
[52] U.S. Cl. ................................... 285/158; 285/331; 285/424; 285/915; 285/906
[58] Field of Search ............... 285/158, 331, 149, 253, 285/424, 189, 205, 208, 906, 915

[56] References Cited

U.S. PATENT DOCUMENTS

| | | |
|---|---|---|
| 737,182 | 8/1903 | Webster .................. 285/189 X |
| 859,733 | 7/1907 | Bot, Jr. . |
| 1,382,049 | 6/1921 | Aspinwall . |
| 1,995,840 | 3/1935 | Compo ........................ 285/189 |
| 2,518,218 | 8/1950 | Benoit ....................... 285/149 X |
| 2,596,936 | 8/1971 | Dieckmann ............... 285/158 X |
| 2,711,127 | 6/1955 | O'Day . |
| 3,186,646 | 6/1965 | Kennedy et al. . |
| 3,290,066 | 12/1966 | Primich et al. . |
| 3,477,745 | 11/1969 | Williams et al. . |
| 3,606,404 | 9/1971 | McGann, Jr. . |
| 3,904,228 | 9/1975 | Maroschak . |
| 3,940,837 | 3/1976 | Wiese . |
| 3,954,289 | 5/1976 | Martin ........................ 285/424 |
| 3,988,030 | 10/1976 | Twedell . |
| 3,998,480 | 12/1976 | Twedell . |
| 4,009,895 | 3/1977 | Koskolos . |
| 4,123,093 | 10/1978 | Newland . |
| 4,177,362 | 12/1979 | Boenecke . |
| 4,249,758 | 2/1981 | Harris ......................... 285/158 |
| 4,349,221 | 9/1982 | Kirby ......................... 285/149 |
| 4,491,124 | 1/1985 | Goettel ................... 285/158 X |
| 4,569,110 | 2/1985 | Goettel ................... 285/424 X |
| 4,620,729 | 11/1986 | Kauffman ................... 285/158 |

OTHER PUBLICATIONS

Crown Products Company, Inc. Brochure—Double-Sided—on Sale, Jan. 1980.

*Primary Examiner*—Dave W. Arola
*Attorney, Agent, or Firm*—Arthur G. Yeager

[57] ABSTRACT

Ring collar for use in connecting a side branch line to a main header air duct, the ring collar having a tubular sheet metal body with an inlet, an outlet end which is tapered for easy insertion into a tubular member, and a U-shaped channel ring around the body with the open side of the channel facing the outlet end of the body; and a process for connecting the ring collar to the main header.

13 Claims, 3 Drawing Sheets

RING SEAL COLLAR FOR AIR DUCTS

BACKGROUND OF THE INVENTION

Heating and air conditioning systems for residences, industrial factories, and office buildings involve large cross-sectional header pipes, usually rectangular insulated sheet metal tubular structures, and a large number of smaller branch lines, usually round insulated sheet metal tubular pipes, leading to vents to distribute the heated or cooled air to the desired spaces inside the building. The typical prior art structure for connecting the branch line to the header involves inserting a short length of pipe into a hole cut in the header to receive the pipe, and fastening the pipe in place by any of a variety of means, and then covering all exposed metal surfaces with a suitable insulation. One means for fastening may involve L-shaped brackets attached to both the header and the pipe with bolts and nuts. Another means is to employ a pipe connection with dovetail cut-out fingers on the end which is inserted into the header, and manually bending the dovetails outward to hold the pipe in place. None of these procedures and structures is entirely satisfactory because the resulting connection is so loose that too much air is lost by leakage.

It is an object of this invention to provide an improved device for connecting branch lines to header lines in air conducting systems. It is another object of this invention to provide a tight connection which eliminates leaks in air conductor piping. Still other objects will become apparent from the more detailed description which follows.

BRIEF SUMMARY OF THE INVENTION

This invention relates to a ring seal collar for air ducts which comprises a thin walled tubular conduit body having an inlet end and an outlet end and an L-shaped channel ring having a bottom leg and an outer leg extending substantially parallel to the conduit body intermediate the ends with the bottom leg of the channel located adjacent the inlet end and the open side of the channel located adjacent the outlet end. The bottom leg has a plurality of spaced holes to receive fasteners for attachment of the collar to a main header of a heating and/or air conditioning system. In specific preferred embodiments of this invention the collar is a sheet metal structure tapered at the outlet end to slide into a tubular member and contains two circumferential recesses, one around the body adjacent the channel ring and the other around the outer leg of the channel ring, both recesses adapted to receive keeper belts, commonly termed "tie straps".

The invention also involves a system for attaching an insulated side branch conduit to a main header of heating and air conditioning distribution system, which comprises the steps of:

(a) cutting a hole in the main header to receive the side branch conduit;

(b) inserting into the hole the inlet end of a ring seal collar having a thin walled tubular conduit body with an inlet end and an outlet end and having rigidly affixed to and around the outside of the conduit a channel ring having an L-shaped cross section with a bottom leg and an outer leg forming a closed side and the outer leg and conduit forming an open side of the channel formed between the conduit and ring, the inner leg being rigidly affixed to the conduit and the closed side facing the inlet end, the bottom leg having a plurality of spaced holes therethrough;

(c) inserting and tightening screws in the spaced holes to clamp the channel ring tightly against the header;

(d) placing over the outlet end a length of tubular insulation having an inner core layer and an outer cover layer with an insulation layer sandwiched therebetween;

(e) peeling back the cover layer and the insulation layer and fastening the inner core layer around the tubular conduit body by tightening a first keeper belt therearound;

(f) inserting the insulation layer into the channel ring to fill the ring completely with the insulation layer; and (g) placing the cover layer around the outside leg of the channel ring and fastening it to the channel ring by tightening a second keeper belt therearound.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The principal features of the ring seal collar of this invention are best understood by reference to the attached drawings.

Figure 1:
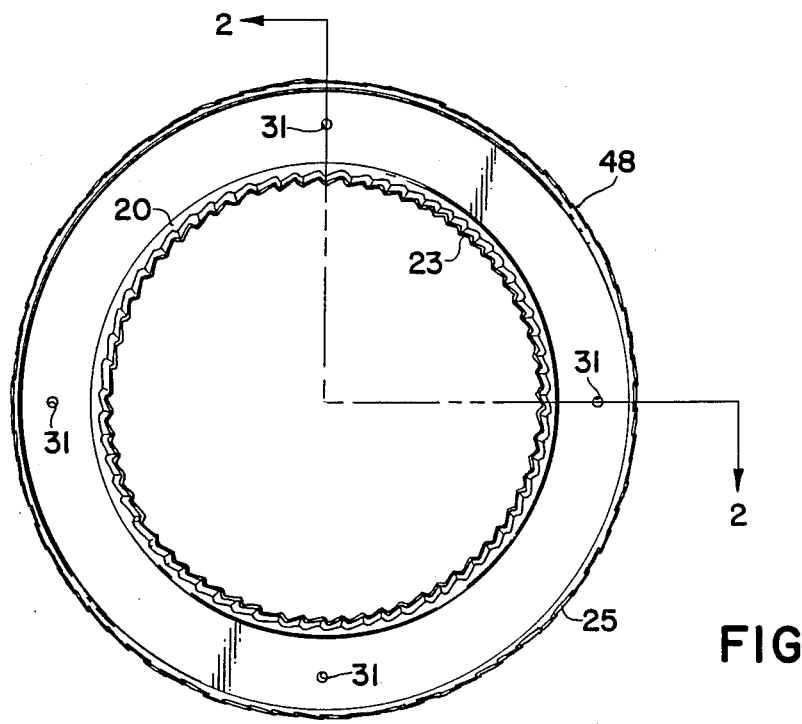
FIG. 1 is a top plan view of the ring seal collar of this invention.
Figure 2:
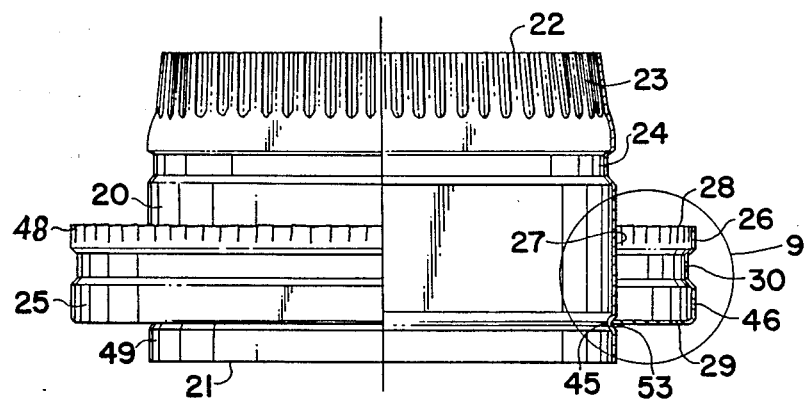
FIG. 2 is a front elevational view, partially in cross section, of the ring seal collar of FIG. 1.
Figure 3:
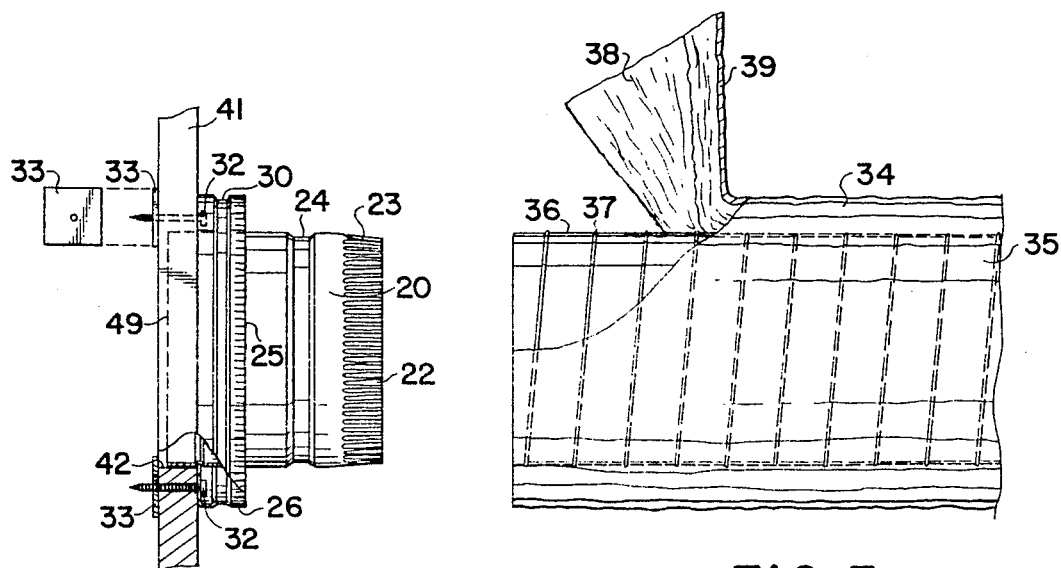
FIG. 3 is a side elevational view of a first step in attaching the ring seal collar to a header conduit of duct board.
Figure 4:
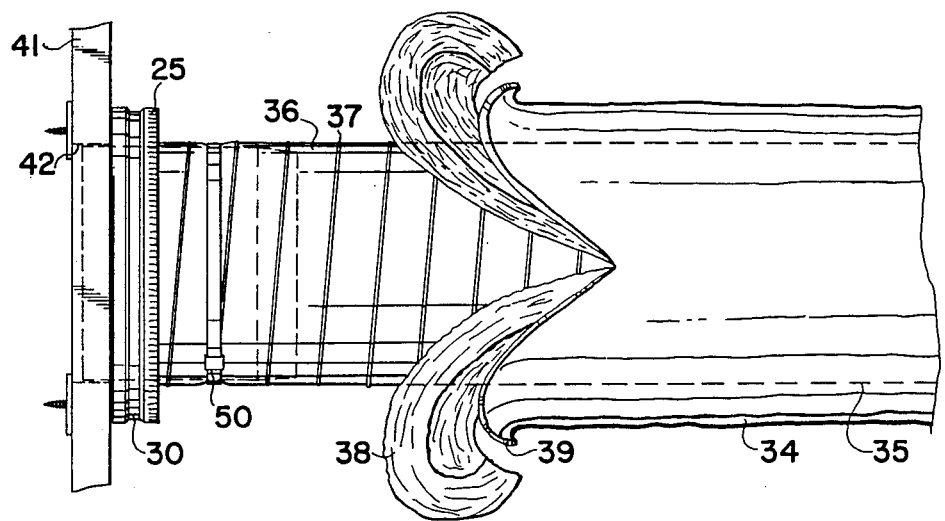
FIG. 4 is a side elevational view of an initial step in attaching a hollow insulation member to the ring seal collar of FIG. 3.
Figure 5:
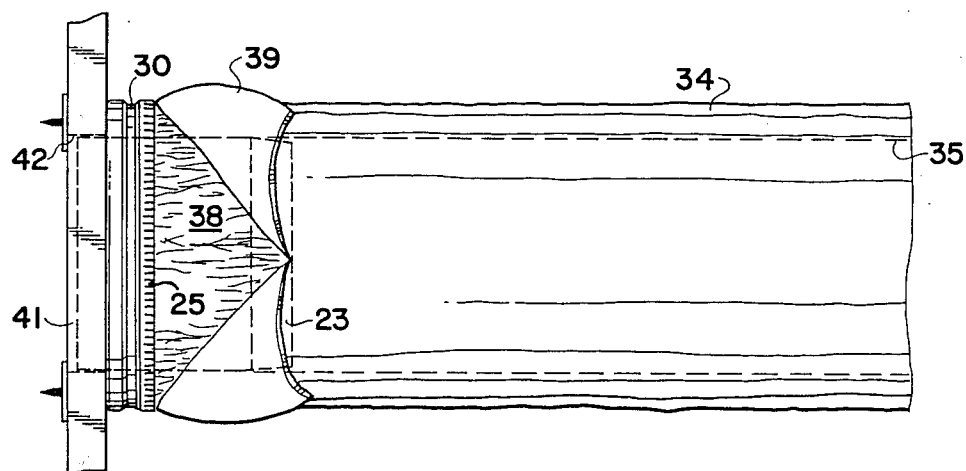
FIG. 5 is a side elevational view of the next step in attaching the insulation member of FIG. 4.
Figure 6:
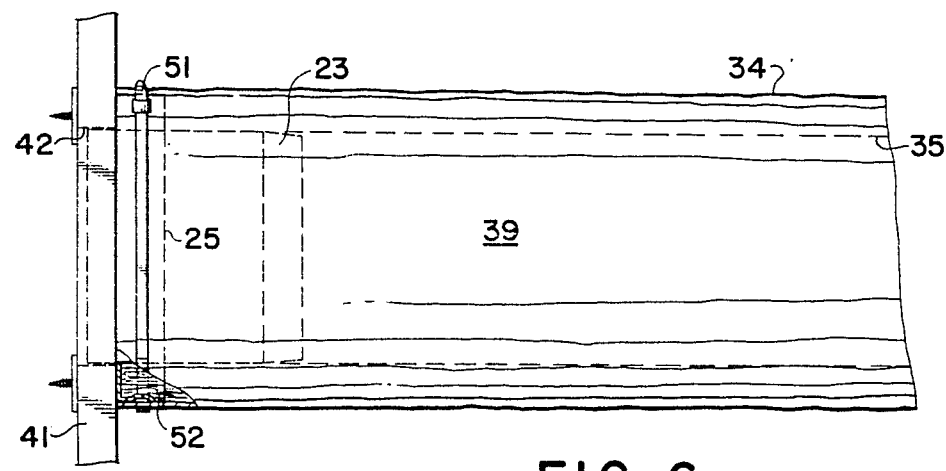
FIG. 6 is a side elevational view of the final step in attaching the insulation member of FIG. 5.

In FIGS. 1 and 2 the ring seal collar and its structure is shown. The collar preferably is made of sheet metal and includes two separate component portions that are affixed to each other to produce a single unitary device. The ring seal collar or either of its component portions may be made of plastic or other suitable material, but sheet metal is preferred. The two portions are a conduit body 20 and a channel ring flange 25. Conduit body 20 essentially is a short section of conduit (e.g., 6-inch pipe) having an inlet end 21 to fit into a header conduit and an outlet end 22 to connect to other lengths of insulated or noninsulated conduit. At outlet end 22 the conduit body is tapered by crimping at 23 to provide an easy insertion into the next section of conduit.

Figure 9:
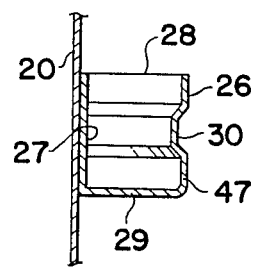
FIG. 9 is a cross sectional view of the area identified as 9 in FIG. 2 on an alternate embodiment.

Ring flange 25 provides a U-shaped channel around the outside of conduit body 20 to function as a seat for a section of insulated conduit 34 (see FIGS. 3–6). Ring flange 25 has an outer leg 26, an open side 28 and a closed side 29. Inner leg 27 of the channel cross-section is provided by a portion of conduit body 20. Ring flange 25 may be an L-shaped structure (as shown in FIG. 2) or a U-shaped structure (as shown in FIG. 9) Both alternatives are acceptable and differ only in the method of attachment to conduit body 20. In the case of the L-shaped structure of FIG. 2, ring flange 25 has an inside edge 53 which fits into bead 45 formed on conduit body 20. No further fasteners are needed to hold flange 25 in place. In the case of the U-shape structure of FIG. 9, inside leg 27 of the channel is affixed to conduit body 20 by adhesive or spot welding, either being acceptable. The end of ring flange 25 is tapered by crimping at 48 to provide for easier reception thereabout of part of the insulated conduit 34.

Ring flange 25 is positioned intermediate inlet end 21 and outlet end 22 with closed side 29 adjacent inlet end 21 and open side 28 facing in the same direction as outlet end 22. Closed side 29 is positioned so as to leave a short portion 49 of conduit body 20 extending below closed side 29. Short portion 49 is inserted into a hole in the header conduit with closed side 29 flush against the header conduit for easy attachment of ring flange 25 and the entire ring seal collar to the header conduit.

Figure 7:
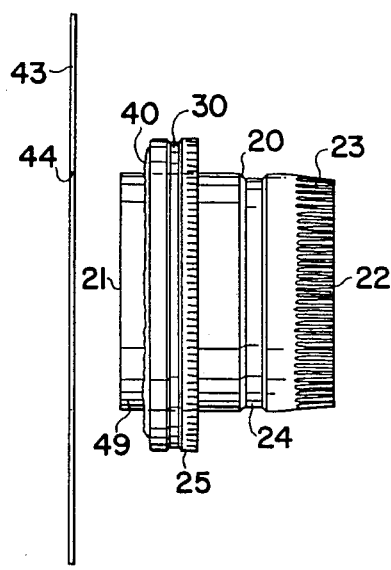
FIG. 7 is a side elevational view of a first step in attaching the ring seal collar of this invention to a sheet metal header conduit.
Figure 8:
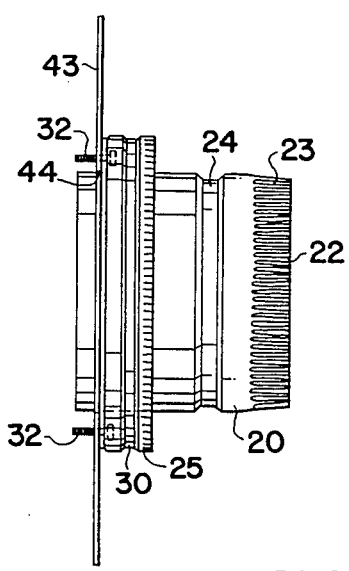
FIG. 8 is a side elevational view of the next step in attaching the ring seal collar in FIG. 7.

There are two circumferential recesses around each ring seal collar for use in attaching an insulated conduit to the collar. One recess 24 is around conduit body 20 between flange 25 and tapered corrugated portion 23 at the outlet end 22. The other recess 30 is around outer leg 26 of ring flange 25. These recesses 24 and 30 are fashioned to function as seats for keeper belts (50 and 51 in FIGS. 4 and 6). Typically these keeper belts are thin plastic straps of ¼-½ inch width. Metal strapping or textile strapping could also be used as the keeper belts. The depth of recesses 24 and 30 should be from about 0.05 to 0.15 inch The system by which the ring seal collar of this invention is attached to a header conduit is illustrated in FIGS. 3–8. First a hole is cut into the header conduit which may be duct board 41 (FIGS. 3–6) or sheet metal 43 (FIGS. 7–8). Duct board 41 typically is prepared as flat sheet stock about 1 inch in thickness of compressed insulation material and an outer covering of a moisture barrier film, e.g., aluminum. The header conduits of duct board or of sheet metal are usually rectangular hollow structures. Hole 42 (in duct board 41) or 44 (in sheet metal 43) is made slightly larger than the outside diameter of short portion 49 of conduit body 20, and short section 49 is inserted in the hole. If a sheet metal header 43 is employed, it is preferable to apply a sealant adhesive 40 to the outside of closed side 29 of ring flange 25. The use of adhesive may also be employed with a duct board header 41, but is not necessary. Ring flange 25 is then pushed against header 41 or 43. Spaced screw holes 31 are already formed in ring flange 25, through which screws 32 are inserted to pull ring flange 25 tight against the header surface. In the case of duct board it is preferred to employ large flat nuts 33 to engage screws 32. If the header is sheet metal 43, screws 32 will engage the sheet metal of header 44 without the need of nuts 33, which merely are small squares of sheet metal with a hole therein to engage the threads of screw 32.

The succeeding steps involve the attachment of an insulated conduit 34 to outlet end 22 of body 20. Generally, the insulated conduit 34 is a multi-layered hollow pipe of varying diameter sizes from 3"–20" I.D., internal hollow 35. The inside layer 36 of conduit 34 is a tubular plastic film structure bound to a helical wire structure 37. This provides a smooth inner surface and sufficient strength through the helical wire to support the entire insulated conduit in a cylindrical tubular fashion without fear of collapsing. The next layer 38 is a thick (e.g., 2 inches) fibrous insulation blanket. The outer layer 39 is a moisture barrier film of aluminum or other suitable material. A portion of the insulated conduit 38 and 39 is peeled back from inner layer 36 and 37, and inner layers 36 and 37 are slid over the outside of outlet end 22 of conduit body 20 until the forward end of layers 36 and 37 are inside ring flange 25. A keeper belt 50 is then fastened tightly around layers 36 and 37 over recess 24.

Insulation layer 38 is then rolled back in place and stuffed into the channel of ring flange 25 to provide a good insulation layer around conduit body 20. Outer layer 39 is then rolled into place over the outside of outer leg 26 of ring flange 25 and held in place by fastening keeper belt 51 over outer layer 39 and over recess 30.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to be secured by Letters Patent of the United States is:

1. A ring seal collar for air ducts which comprises a thin walled tubular conduit body having circumferentially uninterrupted inlet end and an outlet end, an L-shaped channel ring having a bottom leg and an outer leg extending substantially parallel to said conduit body, said bottom leg being rigidly affixed to and around the outside of said conduit intermediate said ends with said bottom leg of said channel ring being adjacent said inlet end and the open side of said channel being adjacent said outlet end, said bottom leg having a plurality of spaced holes through which fasteners may be inserted for attachment to a main header of a conditioned air distribution system.

2. The collar of claim 1 wherein said outlet end is conically tapered and adapted to slide into a central hollow of a tubular member.

3. The collar of claim 1 wherein said conduit is a cylindrical sheet metal tube and said channel ring is a circular flange having a L-shaped cross section with an inside diameter substantially the same as the outside diameter of said conduit and with an outside diameter substantially the same as the outside diameter of tubular insulation to be used with said ring seal collar.

4. The collar of claim 1 wherein said channel ring is fashioned with a circumferential recess in said outer leg forming a seat adapted to receive a circumferential keeper belt.

5. The collar of claim 1 wherein said tubular conduit adjacent said outlet end is fashioned with a circumferential recess forming a seat adapted to receive a circumferential keeper belt.

6. The collar of claim 1 further comprising a plurality of plate members each having a generally centrally disposed hole therethrough and adapted to receive a fastener after it extends through respective said hole in said bottom leg and through a wall of a main header of a conditioned air distribution system formed of duct board whereby said collar is firmly attached thereto.

7. The collar of claim 6 wherein said channel ring and said tubular conduit each include a circumferential recess forming a seat adapted to receive a circumferential keeper belt for attachment of parts of a multilayer tubular insulation to said collar.

8. The collar of claim 1 wherein said bottom leg includes a sealant on its outside surface adjacent said inlet end for sealing same to a wall of a main header of a conditioned air distribution system formed of sheet metal through which threaded fasteners are engaged to firmly attach said collar thereto.

9. The collar of claim 8 wherein said channel ring and said tubular conduit each include a circumferential recess forming a seat adapted to receive a circumferential keeper belt for attachment of parts of a multilayer tubular insulation to said collar.

10. A method for attaching an insulated side branch conduit to a main header of heating and air conditioning distribution system, which comprises the steps of:
   (a) cutting a hole in a wall of a main header to receive the side branch conduit;
   (b) inserting into the hole the inlet end of a ring seal collar having a thin walled tubular conduit body with circumferentially uninterrupted inlet end and an outlet end and being rigidly affixed to and around the outside of the conduit, a channel ring having an L-shaped cross section with a bottom leg and an outer leg forming a closed side and the outer leg and conduit forming an open side of the channel formed between the conduit and ring, the bottom leg being rigidly afixed to the conduit and the closed side facing the inlet end, the bottom leg having a plurality of spaced holes therethrough;
   (c) inserting and tightening screws in the holes of the outer leg and into the wall of a main header to clamp the channel ring tightly against the header wall;
   (d) placing over the outlet end a length of tubular insulation having an inner core layer and an outer cover layer with an insulation layer sandwiched therebetween;
   (e) peeling back the cover layer and the insulation layer and fastening the inner core layer around the tubular conduit body by tightening a first keeper belt therearound;
   (f) inserting the insulation layer into the channel ring to fill the ring completely with the insulation layer; and
   (g) placing the cover layer around the outside leg of the channel ring and fastening it to the channel ring by tightening a second keeper belt therearound.

11. The method of claim 10 further comprising the step of:
   (h) placing a plurality of flat members inside the header wall to receive respective screws after passage through the header wall.

12. The method of claim 10 wherein the main header is a rectangular conduit of duct board, and wherein the screws in step (c) include an enlarged screw head in the channel and an enlarged flat nut threadedly engaging each screw with the nut located inside the conduit of duct board.

13. The method of claim 10 wherein the main header is a conduit of sheet metal and wherein step (b) additionally includes the addition of a suitable adhesive sealant to the outside of the closed side of the ring to seal same against the conduit of sheet metal.

* * * * *

UNITED STATES PATENT OFFICE
CERTIFICATE OF CORRECTION

Patent No. 4,930,815                     Dated  Jun. 5, 1990

Inventor(s)  William P. Tuggle, Jr.

It is certified that error appears in the above-identified patent and that said Letters Patent is hereby corrected as shown below:

Title page, in the heading, cancel "Tuggler" and insert -- Tuggle -- at "[75]", cancel "Tuggler" and insert -- Tuggle --

Signed and Sealed this

Fourteenth Day of May, 1991

Attest:

HARRY F. MANBECK, JR.

Attesting Officer     Commissioner of Patents and Trademarks